3,131,085
COLORING PROCESS
Henry J. Wells, Pittsburgh, Pa., and James H. McNamara, Rome, N.Y., assignors to Aluminum Company of America, Pittsburgh, Pa., a corporation of Pennsylvania
No Drawing. Filed Jan. 18, 1962, Ser. No. 167,157
7 Claims. (Cl. 117—127)

This invention relates to a process for coloring dyeable substrates, particularly oxide-coated aluminum, by employing organic solvents and organic base-solubilized pigments as the color producing materials. Starting with certain pigments which are highly insoluble in water or organic solvents, it is now possible to introduce the fast colors of these pigments into substrates by applying thereto organic base-solubilized derivatives of these pigments and then regenerating the pigments. These solubilized pigments not heretofore considered solubilizable in such manner, are of the quinone or extended quinone configuration, such as, for example, anthraquinone, anthanthrone, pyranthrone, violanthrone, and the like, as well as similarly insoluble derivatives thereof. The pigments referred to are devoid of an NH group in which the hydrogen is weakly acidic. Nevertheless, it has been found that a strong base, such as a quaternary ammonium hydroxide, in a non-acidic polar organic solvent may be employed to effect solution.

In coloring oxide coated aluminum it is preferred that the colorant be sealed in the pores of the coating, as more fully described below. The colored oxide coatings provided by the processes of this invention possess excellent light fastness.

It is an object of this invention to employ pigments highly insoluble in water or organic solvents in novel processes for coloring substrates in even shades of various colors, such as blue, red, yellow, and intermediate hues. It is a particular object to color oxide-coated aluminum in either light or heavy shades. It is also an object of this invention to provide colored oxide coatings on aluminum which exhibit outstanding light fastness.

These and other objects of this invention are accomplished by a process for coloring dyeable substrates which comprises the steps of, (a) applying to the substrate an organic solvent solution of an organic base derivative of at least one insoluble colorant which colorant is selected from the group consisting of quinones and extended quinones, and (b) subjecting the treated substrate to the action of water whereby the solubilized colorant is converted to pigment. The essence of the present invention resides in the use of a pigment or colorant which is highly insoluble in water or organic solvents. We have discovered that such highly insoluble pigments or colorants may, nevertheless, be applied to substrates by treating them with a strong organic base in a specific type of organic solvent. The solubilized colorant may then be converted to the pigment by applying water to the treated substrate. It is quite unexpected that the present process provides colored substrates in a wide range of shades which exhibit outstanding light fastness.

When coloring oxide-coated aluminum it is desirable to seal the pigments within the pores of the coating. Good results have been obtained by converting the solubilized colorant to pigment by subjecting the treated coating to hot water or steam which at the same time seals the pores of the coating. If desired, the solubilized colorant may be converted to the pigment by subjecting the treated coating to cold water first and then applying hot water or steam.

Representative insoluble colorants or pigments which may be used in this invention are illustrated by the following structures. The fundamental structures may be substituted as shown wherein R represents simple substituents, such as phenyl, chlorine, bromine and the like, which are inert to the strong alkaline conditions employed.

(a)
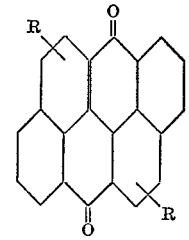

(b)
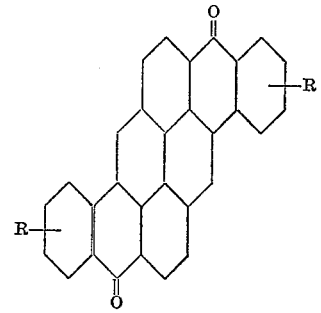

(c)
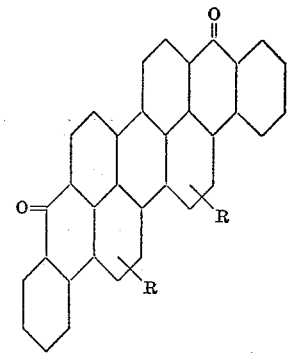

(d)
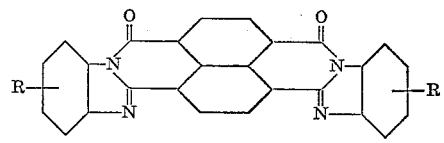

(e)
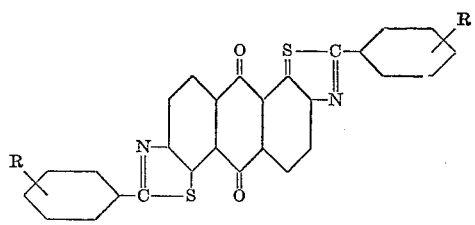

The following is a list of typical pigments that may be used in the practice of this invention:

C.I. 59,105 Vat Orange 1
C.I. 59,300 Vat Orange 3 (Dibromoanthranthrone)
C.I. 59,310 Vat Red 37
C.I. 59,700 Vat Orange 9 (Pyranthrone)
C.I. 59,705 Vat Orange 2 (Dibromopyranthrone)
C.I. 59,800 Vat Blue 20 (Violanthrone)
C.I. 59,815 Vat Blue 18
C.I. 59,825 Vat Green 1 (Dimethoxy violanthrone)
C.I. 59,830 Vat Green 2
C.I. 59,835 Vat Green 4
C.I. 60,000 Vat Violet 10 (Isoviolanthrone)
C.I. 60,010 Vat Violet 1 (Dichloroisoviolanthrone)
C.I. 67,300 Vat Yellow 2
C.I. 71,100 Vat Red 15
C.I. 71,200 Vat Blue 16
C.I. 73,300 Vat Red 41 (Thio indigo Red B)
C.I. 73,335 Vat Orange 5

As noted above, the organic solvent solution of the highly insoluble pigment is formed by treating the pigment with a relatively strong organic base. The solvent employed should be a stable, donor, non-acidic, polar organic solvent which contains an atom selected from the group consisting of oxygen, nitrogen and sulfur. Representative polar solvents include dimethylformamide, diethylformamide, diethylacetamide and dimethylsulfoxide. If desired, these solvents may be used in admixture with other organic compounds such as benzene, acetone, methyl ethyl ketone, pyridine, quinoline, 2-picoline, 2,6-lutidine, pyrrole, tetramethylene sulfone, ethanol, isopropanol, n-butanol, n-amyl alcohol, isoamyl alcohol, sec-isoamyl alcohol, n-octyl alcohol, n-dodecyl alcohol, ethylene-glycol monomethyl ether, the corresponding monoethyl and monobutyl ethers, and cyclohexanol. When using mixtures of the polar organic solvent with the above mentioned compounds, the relative amount of the two materials in the mixture is not critical so long as there is sufficient polar organic solvent present to provide about one part by weight thereof per one part by weight of solubilized colorant. In preparing the organic solvent solution, the temperature is not critical. Temperatures ranging from about 20° C. to about 100° C. are satisfactory. However, temperatures between 20° C. and 40° C. are preferable. The concentration of the colorant in the solution is not critical; however, for practical purposes the solution may conveniently contain about 2 to 5 percent by weight of colorant.

The strong organic base which is used to form the base-solubilized derivative of the colorant or pigment is a quaternary ammonium hydroxide. These hydroxides may be represented by the general formula

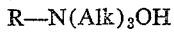

R—N(Alk)$_3$OH wherein Alk designates a lower alkyl radical while R designates a lower alkyl, benzyl or hydroxyethyl radical. Practical illustrations of this group of bases are tetramethyl-ammonium hydroxide, benzyltrimethylammonium hydroxide and 2-hydroxyethyltrimethylammonium hydroxide. The amount of strong base employed should be sufficient to provide at least one molar equivalent for each carbonyl group on the colorant or pigment. However, to assure solution of the colorant it is desirable to add more than this amount of base.

Oxide coated aluminum may be treated with the organic solvent solution of the base-solubilized colorant by immersing the coated aluminum in the solution at temperatures of about 20 to 100° C. for a period of time of a few seconds to 10 minutes. In lieu of immersing the coated aluminum in the solution it is possible to treat the same by well-known spraying or painting techniques. The oxide coated aluminum is then removed from the solution and the base-solubilized colorant then converted to pigment by one of several procedures. In the first of these, the treated aluminum is subjected to the action of boiling water or steam. This procedure converts the base-solubilized colorant to pigment and seals the pores of the coating. In another procedure, the anodized aluminum is subject to the action of cold water (temperatures of about 25° C. or lower). This converts the base-solubilized colorant to pigment and the pores of the anodized aluminum are then sealed by the use of boiling water or steam.

When a thin anodic coating on aluminum (e.g. an 0.2 mil coating) is treated in accordance with this invention instead of a thicker coating (e.g. 0.8 mil coating), colorations are obtained which are somewhat less intense.

Lighter shades may also be obtained by employing more dilute solutions of the pigment and, conversely, darker shades may be obtained by using more concentrated solutions. Color shades may also be varied by varying the period of time the substrate is subject to the action of the solution.

The following examples will illustrate the nature of the present invention; however, the invention is not intended to be limited to these examples. Parts are by weight unless otherwise indicated.

*Example I*

To a slurry of 5 g. of pyranthrone in 100 ml. of dimethylformamide and 200 ml. of methylethyl ketone is added, at room temperature, 30 ml. of benzyltrimethyl ammonium hydroxide. To the solution thus obtained there is preferably added, in accordance with the teaching of copending patent application Serial No. 43,736, filed July 19, 1960, in the names of James H. McNamara, Rolf Rolles and Henry J. Wells, a solution of 50 g. of ethyl cellulose N–50 in 470 ml. of methylethyl ketone and 200 ml. of cyclohexanone to allow spray applications of the solution to the substrate to be colored. This formulation is applied to an aluminum sample having an 0.8 mil thick anodic oxide coating, then force dried at 95° C. for 5 minutes. Thereafter the sample is immersed in boiling water for 20 minutes to effect both development of the pigment and sealing of the anodic coating. The bright gold color which develops during this latter step is lightfast for at least 1000 hours in the Fade-Ometer.

*Example II*

To a slurry of 5 g. of dibromoanthanthrone in 200 ml. of dimethylformamide is added 30 ml. of benzyltrimethyl ammonium hydroxide. To this solution is added 500 ml. of methylethyl ketone. An aluminum sample having an 0.8 mil anodic oxide coating is dipped in the solution for 5 minutes, removed, then heated at 100° C. for 5 minutes. The sample is then immersed in boiling water for approximately 20 minutes to effect both development of the pigment and sealing of the anodic oxide coating. The red-orange color which develops during this latter step is lightfast for at least 1000 Fade-Ometer hours.

*Example III*

A solution of 8 g./l. of pyranthrone, 100 ml. of dimethylformamide, 90 ml. of methylethyl ketone and 40 ml. of benzyltrimethyl ammonium hydroxide is prepared. When wool, "Dacron" polyethylene terephthalate, or nylon fibers are dipped into this solution for a few seconds, removed, and dipped in hot water a nice even gold color develops.

In any of the foregoing examples, other pigments and organic bases as described herein may be employed and also the conditions of solution preparation and use may be varied as indicated herein.

By employing the process of the present invention wherein organic solvent solutions of base-solubilized colorants or pigments are used, it is possible to color substrates rapidly and effectively in essentially all hues of the visible spectrum in either light or heavy shades. The colored substrates exhibit outstanding lightfastness. In the case of colored oxide coated aluminum it often exceeds 1000 hours exposure in the Fade-Ometer.

As many widely different embodiments of this invention may be made without departing from the spirit and scope thereof, it is to be understood that this invention is not limited to the specific embodiments thereof except as defined in the appended claims.

What is claimed is:

1. A process for coloring dyeable substrates which comprises
   (a) applying to the substrate an organic solvent solution of an organic base derivative of at least one pigment highly insoluble in water and organic solvents, devoid of an NH group in which the hydrogen is weakly acidic, and selected from the group consisting of quinones and extended quinones, which solution is formed by treating said pigment with a quaternary ammonium hydroxide in the presence of a solvent selected from the group consisting of stable, donor, non-acidic, polar organic solvents which contain an atom selected from the group consisting of oxygen, nitrogen and sulfur, and
   (b) subjecting the treated substrate to water.

2. A process according to claim 1 wherein the organic solvent solution is prepared by mixing the pigment in said solvent in the presence of at least one equivalent, per carbonyl group in said pigment, of a quaternary ammonium hydroxide having the general formula R—N(Alk)$_3$OH wherein Alk is a lower alkyl radical and R is selected from the group consisting of lower alkyl, benzyl and hydroxyethyl radicals.

3. A process for coloring an oxide coating on aluminum which comprises
   (a) applying to the oxide coating an organic solvent solution of an organic base derivative of at least one pigment highly insoluble in water and organic solvents, devoid of an NH group in which the hydrogen is weakly acidic, and selected from the group consisting of quinones and extended quinones, which solution is formed by treating said pigment with a quaternary ammonium hydroxide in the presence of a solvent selected from the group consisting of stable, donor, non-acidic, polar organic solvents which contain an atom selected from the group consisting of oxygen, nitrogen and sulfur, and
   (b) subjecting the treated oxide coating to water.

4. A process according to claim 3 wherein the treated oxide coating is subjected to the action of cold water followed by treatment with hot water.

5. A process according to claim 3 wherein the organic solvent solution is prepared by mixing the pigment in said solvent in the presence of at least one equivalent, per carbonyl group in said pigment, of a quaternary ammonium hydroxide having the general formula R—N(Alk)$_3$OH wherein Alk is a lower alkyl radical and R is selected from the group consisting of lower alkyl, benzyl and hydroxyethyl radicals.

6. A process for coloring dyeable substrates which comprises
   (a) applying to the substrate an organic solvent solution of an organic base derivative of pyranthrone, which solution is formed by treating pyranthrone with a quaternary ammonium hydroxide in the presence of a solvent selected from the group consisting of stable, donor, non-acidic, polar organic solvents which contain an atom selected from the group consisting of oxygen, nitrogen and sulfur, and
   (b) subjecting the treated substrate to water.

7. A process for coloring an oxide coating on aluminum which comprises
   (a) applying to the oxide coating an organic solvent solution of an organic base derivative of dibromoanthanthrone, which solution is formed by treating dibromoanthanthrone with a quaternary ammonium hydroxide in the presence of a solvent selected from the group consisting of stable, donor, non-acidic, polar organic solvents which contain an atom selected from the group consisting of oxygen, nitrogen and sulfur, and
   (b) subjecting the treated oxide coating to water.

References Cited in the file of this patent

UNITED STATES PATENTS

| | | |
|---|---|---|
| 2,237,483 | Graenacher et al. | Apr. 8, 1941 |
| 2,614,912 | Rice | Oct. 21, 1952 |
| 2,975,081 | Kirby et al. | Mar. 14, 1961 |
| 3,019,143 | Dessauer | Jan. 30, 1962 |